July 14, 1936.  E. L. GRIFFITH  2,047,626
DISCHARGING PLASTIC MATERIAL AND DEVICE THEREFOR
Filed Jan. 18, 1935
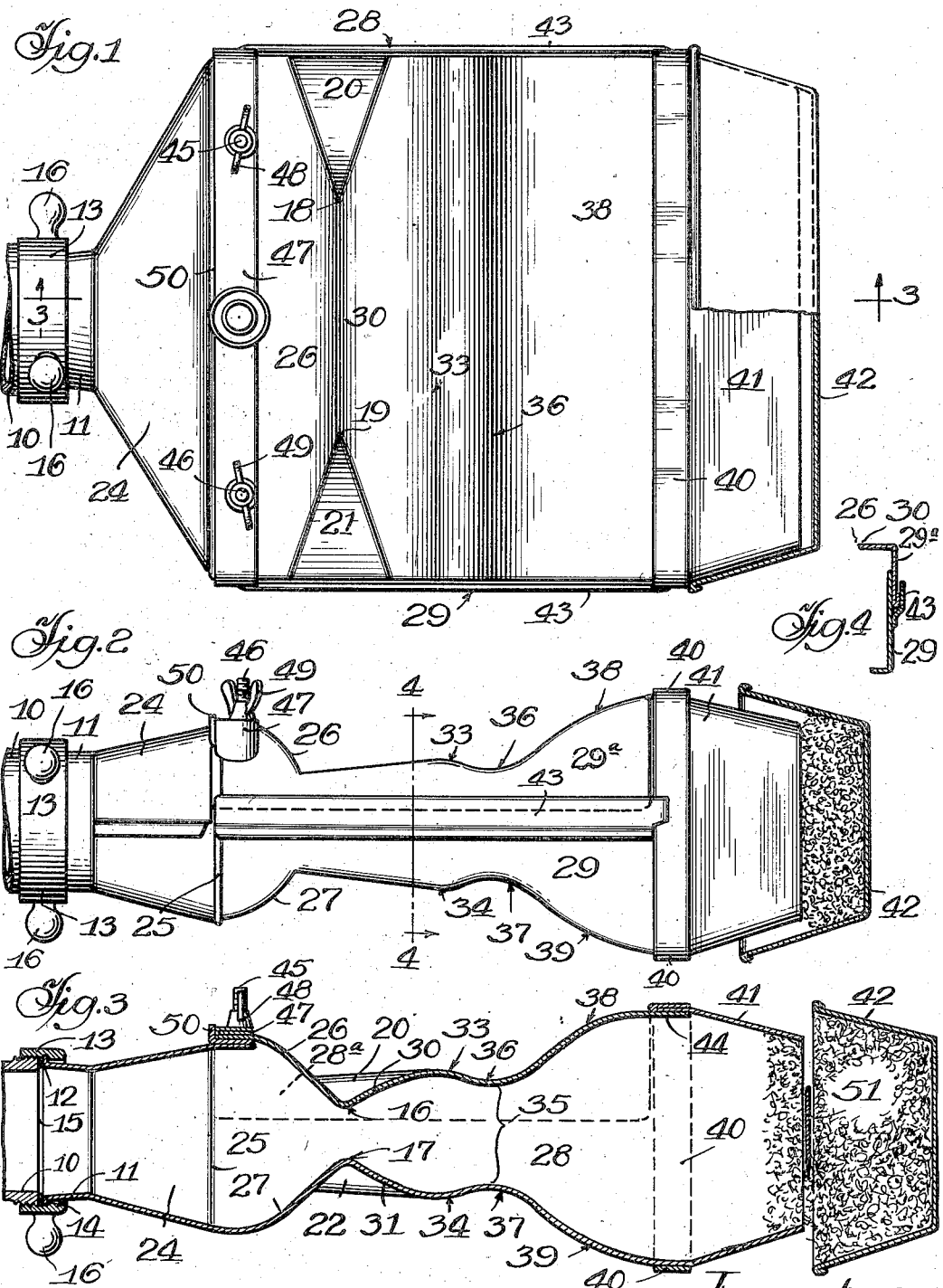
Witness:
Chas. R. Koursh
Inventor,
Enoch L. Griffith,
By W. Bartlett Jones, Atty.

Patented July 14, 1936

2,047,626

UNITED STATES PATENT OFFICE 2,047,626

DISCHARGING PLASTIC MATERIAL AND DEVICE THEREFOR

Enoch L. Griffith, Chicago, Ill., assignor to The Griffith Laboratories, Inc., Chicago, Ill., a corporation of Illinois Application January 18, 1935, Serial No. 2,447

6 Claims. (Cl. 226—93)

The present invention relates to filling pans and the like, and more particularly to a device for stuffing ground meat, as for meat loaves into pans wherein the loaves are sold or cooked.

The particular device is one which is an "adapter" device, having at one end a small entrance orifice for communicating with the outlet of a grinding, forcing or mixing machine, said adapter having a larger distributing orifice at the other end. Essentially the device is of generally flaring construction.

It is a general object of the invention to construct the adapter so that in the passage of substance from the smaller to the larger end the density and distribution of the material discharged is quite uniform, and so that the discharging pressure is quite uniform over the discharging area.

A particular object of the invention is the provision of an adapter for a small round orifice to discharge over a large rectangular area.

Another object of the invention is the provision of an adjustment in the device for regulating the density of the material discharged.

Still another object of the invention is a method of repressing and diverting the flow of substance in a channel to unify the flow over an enlarged portion of the channel.

Other and ancillary objects and advantages of the invention will become apparent in the following explanation of the invention attending the description of an exemplary embodiment of the invention in a device particularly designed for extruding the mixtures which form meat loaves, as shown in the accompanying drawing, in which:

Fig. 1 is a plan view of the device with a pan in position to be filled.

Fig. 2 is a side view of the device of Fig. 1, showing the pan about half filled.

Fig. 3 is a longitudinal section of the device on line 3—3 of Fig. 1.

Fig. 4 is a detail cross-sectional view on the line 4—4 of Fig. 2.

From the following description it will be understood that the invention may be otherwise embodied into other forms falling within the scope of the invention as defined by the appended claims.

The common meat grinders and other machines discharge through a circular orifice similar to that designated 10 in the drawing. The device of the present invention is equipped with a simple coupling for attachment to the illustrative orifice 10. The coupling comprises a generally cylindrical neck 11 on the device with a flange 12, and a threaded ring 13 with shoulder 14 engaging under the flange 12, and with threads engaging with the discharge orifice 10 for drawing the latter and the neck 11 together with an interposed packing ring 15, if desired. Knobs 16 may be provided on the coupling ring to avoid use of a wrench.

The device proper consists of a peculiar shaped casing or structure designed to retard flow of substance in one direction and to divert it to another place. First, the aim is to spread incoming substance laterally (top and bottom in Fig. 1). For this purpose a constricted passage is formed ahead of the neck 11 and in line therewith. This constricted passage is shown between the lines running from points 16 and 17 in Fig. 3 and points 18 and 19 in Fig. 1. Laterally on each side of this constricted passageway the device has an increasing cross-section toward the sides shown by the presence of triangular faces 20 and 21 in Fig. 1, and 20 and 22 in Fig. 3, in pairs flaring outwardly.

The device flares on four sides quickly from the neck 11 in the form of a hood-like structure 24 to a rectangular form or cross-section terminating at line 25. From the line 25, the top and bottom walls of the device lead to the aforesaid constriction by the walls 26 and 27, between parallel side walls 28 and 29. From the aforesaid constriction the walls 30 and 31 flare away from each other, between the parallel side walls, forming the opposite ridges 33 and 34, beyond which there is another slight constriction 35 with valleys 36 and 37 on the outside of the device. From the constriction 35 the walls flare at 38 and 39 widely as shown to a rectangular frame 40. Attached to the frame is a constricted doubly tapered discharge casing 41, which corresponds with the interior of a like-shaped loaf-pan 42.

In order to control the degree of constriction one of the large curved walls is adjustable movably with relation to the other. The lower wall in Fig. 3, designated 27—31 with the ridges and valleys described, is integral with the device as a whole, and the top wall (Fig. 3) designated 26—30 is movable.

On each side the side walls are capable of telescoping. Fig. 4 shows the lower part of wall 29 integral with the device, provided with a sliding engagement with side wall 29ª, integral with the movable wall 26—30. A retaining bead 43 receives the free edge of wall 29ª. The movable wall 26—30 has a tongue 44 fitting closely to the interior of the rectangular frame 40, and this tongue serves as a pivotal axis for the movable wall, which has its greatest movement at the line 25. At this position the casing carries threaded pins 45 and 46 which pass through holes in a reinforced edge 47 of the movable plate, and bear wing nuts 48 and 49. An angle iron provides a flange 50 integral with the casing. The flange closes any space which would be formed by separating the two specially shaped walls. The pressure of substance moves the movable plate outwardly to the limit set by the wing nuts.

By means of the adjustment described the aforesaid primary constriction between points 16 and 17 in Fig. 3 and between points 18 and 19 in Fig. 1, is variable. A change will regulate the density of the substance discharged.

The portion 41 which fits the pan is not necessarily tapered, but is desirably tapered for several reasons. For one, it fits the pans usually employed for loaves. For another, it serves to compress the substance as it is discharged and it later may expand in the pan to equalize the density in the pan and to cause the center to round up somewhat. It also serves to prevent substance dropping too freely from the device when a pan is being changed.

Inside the device, the substance flows under pressure from the neck 11 forwardly, meeting the primary constriction defined at 16—17 and 18—19. On each side of this constriction there is an enlarged cross-section to which flow results. The parts are designed so that the material passing through the constriction and through the areas on each side of the constriction move at approximately the same density and quantity, when the ridges 33 and 34 are passed. The slight compression by the constriction 35 checks the flow of all and tends further to equalize the status before passing the constriction 35. Thereafter, the material expands to an approximately equal degree, and is again compressed in the discharge end 41. The entire process is a sort of kneading process as the material passes through the device.

In use the device is of great value in discharging substance, such as for meat loaves, so that the corners of a rectangular pan are filled, and so that the center is not over filled relative to the material in the corners. Where a loaf is cooked and removed from the pan, it is important that the corners of the loaf be strong and well attached to the body of the loaf, and that the loaves be of uniform desirable structure and appearance.

To operate the device, it is attached to the nozzle 10 of a grinder, mixer, or like machine which forces out a plastic mixture. A pan 42 is held over the end of the device with which it corresponds. The extrusion of substance is uniform against the bottom of the pan, and the extruded substance is slightly compressed because of the tapering end 41 of the device. When the pan is clear of the device, an operator quickly severs the material along the top of the pan by a blade indicated at 51. Then another pan is quickly placed over the end of the device for filling in the same way.

I claim:

1. A discharge device comprising a casing, a hood-like structure on one end of the casing providing an orifice near the center of the hood-like structure remote from the casing, a coupling at said orifice for attachment of the device to a supply of plastic material, said casing having parallel side walls, and irregular opposed facing walls providing a constriction of cross-section in advance of the said orifice, and a greater cross-section ahead of and beyond said constriction.

2. A discharge device comprising a casing, a hood-like structure on one end of the casing providing an orifice near the center of the hood-like structure remote from the casing, a coupling at said orifice for attachment of the device to a supply of plastic material, said casing having parallel side walls, and irregular opposed facing walls providing a constriction of cross-section in advance of the said orifice, and a greater cross-section on each side of said constriction, and providing at least one other constriction extending between the said side walls whereby to effect kneading of the material passing said constriction.

3. A discharge device comprising a casing having a body portion with generally rectangular cross-sections in parallel planes comprising parallel plane side walls and irregular facing walls, a hood-like end on the body portion tapering to an inlet orifice for the casing, said facing walls being indented at a region spaced inwardly from the side walls and in location to restrict the cross-section opposite said orifice with increasing area to the cross-section from said location toward each side wall.

4. A discharge device comprising a casing flaring generally from a small inlet orifice to a larger and rectangular discharge orifice, said casing having at the inlet end a hood-like structure with rectangular cross-section at the larger end parallel with said orifice at its smaller end, opposite side walls from said hood extending to the other end having the rectangular cross-section, and opposed facing walls to complete the casing between said parallel side walls, said facing walls tapering relatively inwardly from the hood with less taper near the side walls, with greatest taper at a central zone opposite the inlet orifice, and a graduated taper from said zone to said side walls, said side walls then proceeding in the flaring direction of the outlet with a general flaring course from said constricted zone.

5. A discharge device comprising a casing flaring generally from a small inlet orifice to a larger and rectangular discharge orifice, said casing having at the inlet end a hood-like structure with rectangular cross-section at the larger end parallel with said orifice at its smaller end, opposite side walls from said hood extending to the other end having the rectangular cross-section, and opposed facing walls to complete the casing between said parallel side walls, said facing walls having means providing a limited constriction in the passageway through the casing located opposite the inlet orifice, whereby the flow in the casing directly from said orifice is limited and in part diverted laterally to equalize the flow through the passageway in said casing beyond the constricted area.

6. A discharge device comprising a generally flaring casing with four walls providing generally rectangular cross-sections at any one place except at a constricted zone, a tapered hood at the smaller end having an inlet orifice for the casing, said restricted zone having a cross-section which is narrow for a region opposite the orifice and close to the hood to limit direct flow from the orifice, and which increases outwardly from said region to pass more substance as the same nears the side walls.

ENOCH L. GRIFFITH.